Oct. 24, 1967  G. R. UTTING ETAL  3,348,418
AUTOMATIC SAMPLE CHANGER
Filed Aug. 13, 1963  7 Sheets-Sheet 1

INVENTORS
GEORGE R. UTTING
PETER G. MUELLER
BY Steward + Steward
ATTORNEYS

United States Patent Office

3,348,418
Patented Oct. 24, 1967

3,348,418
AUTOMATIC SAMPLE CHANGER
George R. Utting, Guilford, and Peter G. Mueller, Hamden, Conn., assignors to Intertech, Inc., North Haven, Conn., a corporation of Connecticut
Filed Aug. 13, 1963, Ser. No. 301,801
10 Claims. (Cl. 73—421)

This invention pertains to a method and apparatus for storing a plurality of generally similar samples or specimens to present these in orderly sequence to a test station at which some test operation is to be performed, after which the articles are returned to their original relative positions at the storage point. The invention and specific apparatus herein described by way of example are more particularly directed to automatic, repetitive testing of samples of various materials by radioassay procedures in order to determine characteristics of the samples.

Radioassay determination of the properties of materials is used extensively in testing and evaluating a wide variety of substances to determine chemical, biological, metallurgical and various other physical properties of materials. Such tests are commonly conducted by first rendering the material to be tested radioactive and then placing a sample of the material in a test chamber incorporating a radiation detecting device, such as a Geiger counter. The test may determine the radiation count, i.e. units of radiated energy produced by a sample within a given period of elapsed time, or alternatively the test may determine the time lapse required to produce a given count. Commonly, a large number of samples are subjected to radioassay in evaluating a material, and it becomes extremely time-consuming, without special sample handling apparatus, to present the samples manually to the test chamber, record the test results and return the samples to a point of storage. Various schemes have accordingly been devised for automating these operations. The present method and apparatus provide further improvements and advantages in respect to the storage and transport of the samples to and from a test station in radioassay procedures.

One of the principal objectives of the invention is that of providing greater storage capacity, i.e. permitting the handling of a greater number of samples completely automatically, than has heretofore been possible.

A further objective is the reduction of sample handling time whereby a greater number of tests can be completed in a given period.

Still other objectives include the immediate return of a sample, following a test cycle, to its original position relative to other samples to be tested, so that all of the samples are always available in their original relative positions and do not require a recycling or repositioning operation to restore them to that condition. It is of course desirable, if not always essential, to retain the original order or sequencing of the samples so that the recording of data from them may be properly collated by auxiliary automatic recording equipment of known type used to record the test results for each sample and thus provide a permanent record thereof.

Greater simplicity of mechanical arrangement, and consequent economy of manufacture and servicing of the automatic sample changer mechanism are also important objectives of this invention. These and other objects and advantages are achieved through the application of the concept here disclosed as will be apparent from the following description of a specific embodiment shown in the accompanying drawings for purposes of illustration, in which.

The automatic sample changer illustrated in the drawings comprises means for storing samples supported in one or more box magazines. The magazines, preferably of molded plastic, carry a plurality of generally flat or lamellar slides of molded plastic, for example, each having a removable metal planchet or tray on which test material is placed. The slides and their respective samples are slidably received in racks molded in opposite sides of a magazine to support the slides in tiered alignment one above another, whereby each slide is individually removable through an open face of the magazine. Mechanism is provided for supporting a number of such magazines and for positioning any selected magazine opposite a conveyor having transport means for engaging the individual slides in sequence and transferring them one at a time to a test position, finally returning the slides to their original positions in the magazine. The slides in a magazine are presented for test automatically in sequence within the selected magazine by shifting the latter axially of the tier of samples therein to dispose each slide in turn at a given level. At this level, the aforesaid conveyor transport means engages a first slide and moves it to the test position and then returns it to the magazine, whereupon the magazine is shifted axially to bring the next slide in sequence to the level of the slide transport, and the operation is repeated.

As a slide is withdrawn from the magazine, it is slid in the plane of its body to a first predetermined position or station at which point further advance of the slide is blocked, although the conveyor means transporting the slide continues to advance. Such continued advance of the conveyor after interruption of the forward travel of the slide is utilized to operate a sample elevator or plunger located beneath the initial run portion of the conveyor. This plunger, when thus actuated, intercepts the slide at the aforesaid first location, lifting the removable sample planchet from the body of the slide in which it normally is nested. Continued travel of the conveyor produces further elevation of the sample until the latter arrives at a second predetermined position likewise established to prevent further travel of the sample in this new or second direction. The conveyor is stopped at this point but again provision is made for overtravel of the conveyor means, with respect to the arrival of the plunger and sample at this second position. At this second position, the sample is enclosed in a radiation shield in which suitable radiation detection means is mounted. Generally it is desirable at this time to flood the interior of the shield above the sample with a counting gas, such as methane, to reduce background radiation error. In this period a radiation count is taken and suitably recorded so as to be identified with the sample undergoing test. Upon completion of this test operation, the travel of the conveyor element is restarted but in reverse direction, retracting the plunger and the planchet to redeposit the latter in its slide and subsequently to return the slide by means of the sample transport to its original position in the magazine.

The various steps of the operation just described are repeated until each of the samples in the magazine has been tested, at which time that particular magazine is returned to its stored position and a new magazine is indexed into operative position to feed slides to the sample transport conveyor. By provision of suitable control circuit means, this operation is carried on automatically until all samples in all magazines have been subjected to test. The control may be set to give one complete test cycle for all samples, or the controls may be set to give more than one cycle so that subsequent test results may be compared with earlier results.

Figure 1:
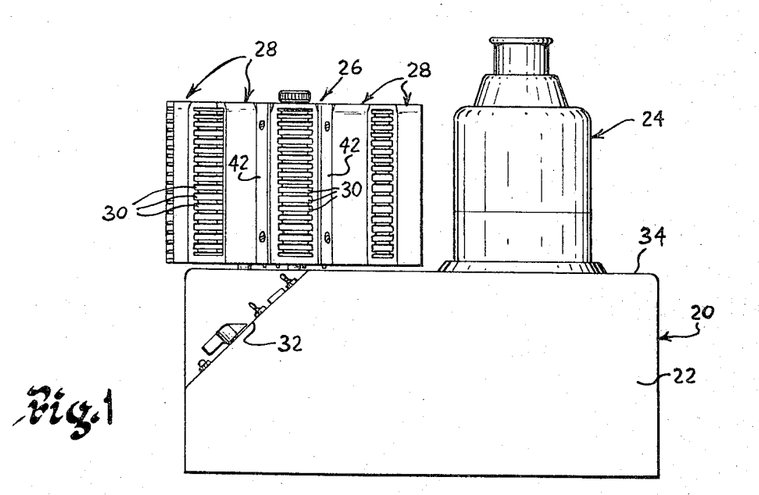
FIG. 1 is an assembly view in side elevation of an automatic sample changer.
Figure 2:
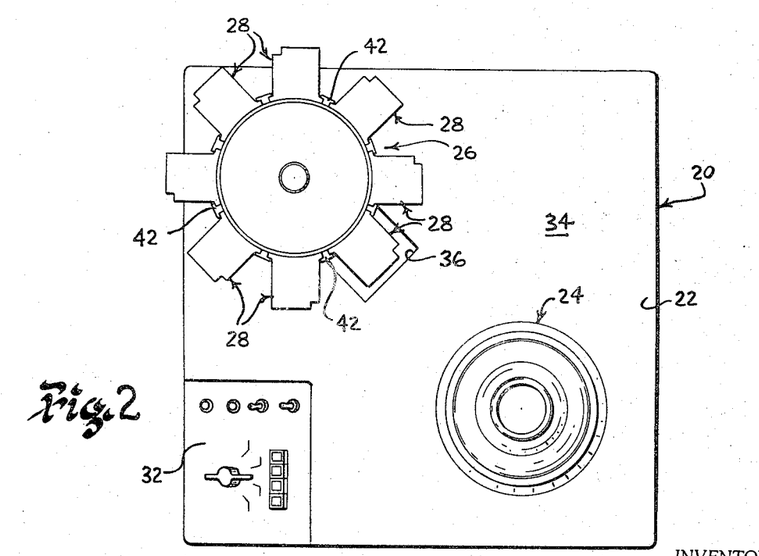
FIG. 2 is a top plan view of the changer shown in FIG. 1.

Having described the operation of the changer generally, reference is now made to the drawings for a more detailed description. The changer unit 20, FIGS. 1 and 2, comprises a housing 22 constituting a base enclosing a part of the changer mechanism and serving also as a mounting platform for a radiation detection station shield 24 and a sample turret or carrousel 26. The turret accommodates a number of box magazines 28, each of which carries a plurality of sample slides 30. Base 22 is provided with a panel 32 upon which are mounted the function switches and complementary indicators for controlling the operation of the device.

Figure 7:
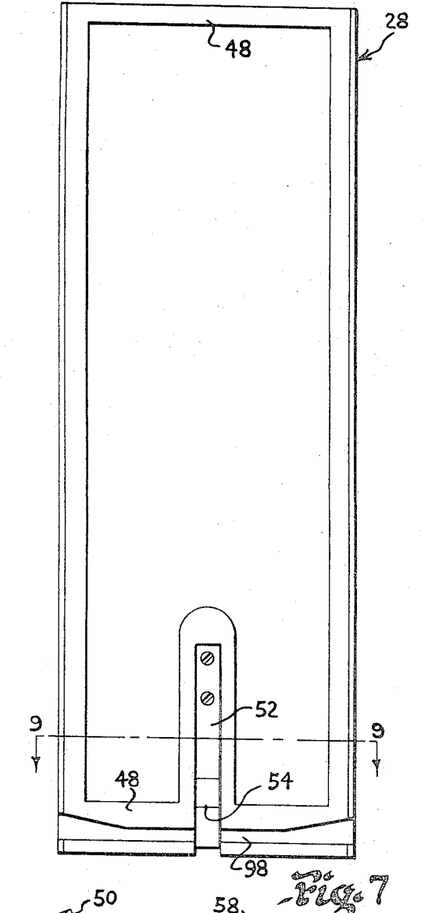
FIG. 7 is a view in rear elevation of a box magazine for supporting and storing samples to be tested.
Figure 8:
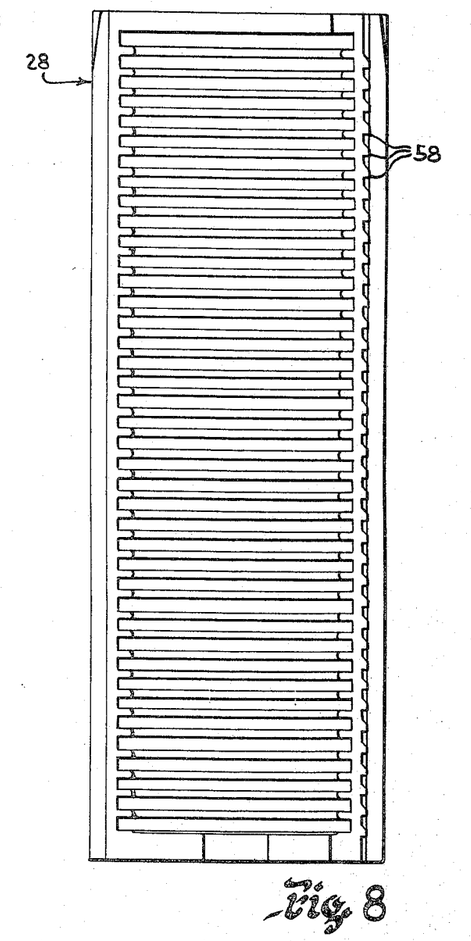
FIG. 8 is a front elevational view of the magazine with a number of sample slides positioned therein.
Figure 9:
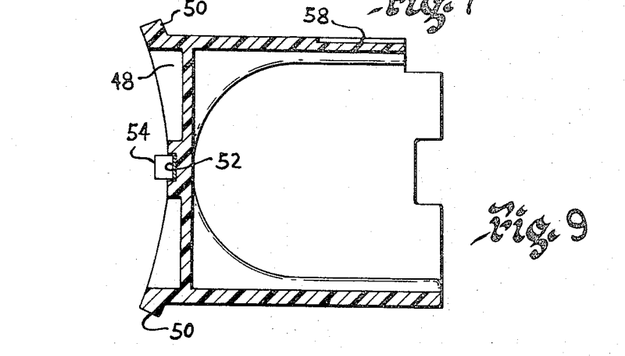
FIG. 9 is a transverse section through a magazine taken along line 9—9 of FIG. 7, looking in the direction of the arrows.
Figures 10, 11:
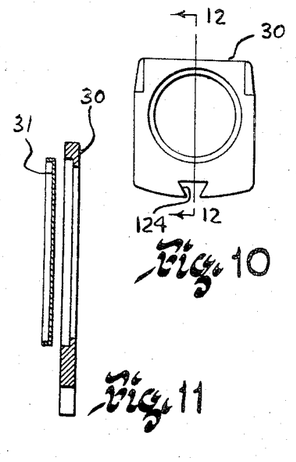
FIG. 10 is a plan view of an assembled sample slide and planchet.
FIG. 11 is an exploded side view of a sample slide and planchet, on an enlarged scale.

As mentioned, the upper surface 34 of base 22 comprises a platform upon which turret 26 and shield 24 are supported. This platform is apertured at 36, as seen best in FIG. 2, to accept a magazine 28 shifted axially of the turret when positioned in registry with the aperture, as more fully described hereinafter. Turret 26 comprises a cylindrical drum with an outer wall 40 provided with circumferentially spaced flanges 42 having overhanging head portions 44. Each flange forms with the immediately adjacent flange axially aligned tracks spaced about the turret (see FIG. 5). Each magazine 28 is formed with a pair of integral flanges 50 extending the length of the magazine, one at each rear corner and projecting slightly to the side of the magazine. Flanges 50 are engaged by the overhang 44 of the turret tracks 42 to provide sliding engagement between the magazine and the turret. The magazines are thus supported on the face of the turret for rotation therewith and for axially shiftable movement relative thereto. In order to prevent the magazines from dropping into contact with the platform 34 when they are slid downwardly on the tracks of the turret, each magazine is provided in its rear wall with a spring detent 52 (FIGS. 3, 7 and 9) having a projection 54 adapted to be received in a recess 56 in wall 40 near the base 62 of the turret and serving to releasably support the magazine by engagement of the detent in the recess. Detent 52 is depressed, as presently explained, when a magazine is swung by the turret into operative position to allow the magazine to be lowered through aperture 36 of platform 34.

Figure 3:
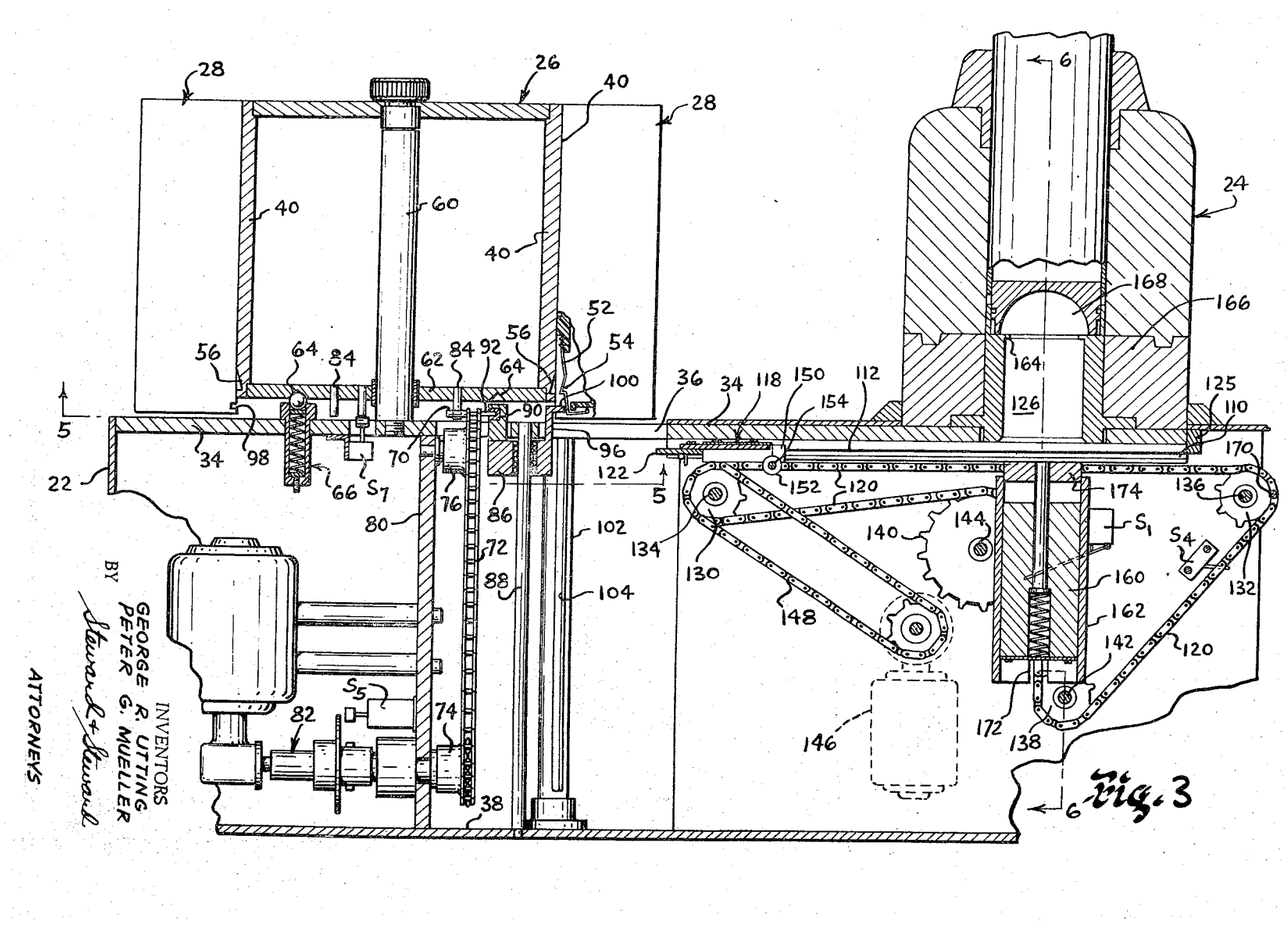
FIG. 3 is a view in side elevation of the changer; parts being broken away and shown in section for greater clarity of illustration.
Figure 5:
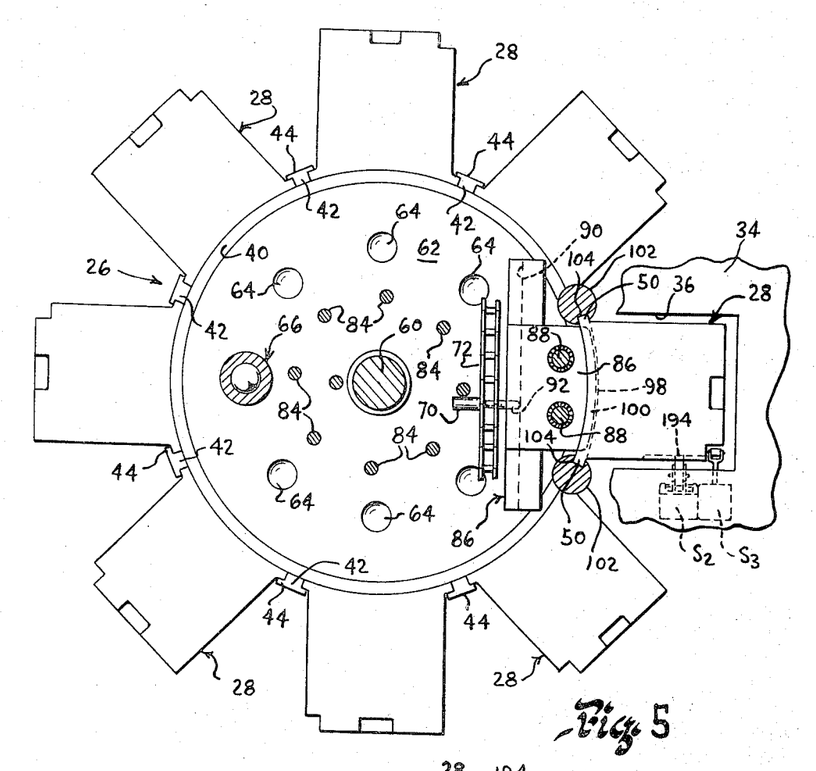
FIG. 5 is a plan view, taken on line 5—5 of FIG. 3, looking in the direction of the arrows.

Turret 26 is mounted for rotation on spindle 60 suitably secured in upright position on platform 34. Referring to FIGS. 3 and 5, base 62 of the turret is formed at its under surface with a plurality of relatively shallow depressions 64. These depressions are arranged concentrically in base 62 and are located on the respective radii of the turret passing through the center of the several slide magazines 28. A detent ball and spring, indicated generally at 66, is secured in platform 34 to cooperate with depressions 64 whereby to center and temporarily restrain the turret in successive indexed positions aligning a magazine 28 in each of these positions with aperture 36 of platform 34.

Turret 26 is rotated intermittently to index it to successive positions by means of roller pin 70 carried by a roller chain 72. The latter is trained about sprockets 74, 76, 78 (see FIGS. 3 and 4) which are suitably journaled on partition 80 within housing 22. Sprocket 74 is the drive sprocket and motive power is supplied to this by means of a motor and clutch assembly indicated generally at 82. Sprockets 76 and 78 are positioned to define a horizontal run of roller chain 72 which is substantially parallel to and spaced slightly above the upper surface of platform 34. Base 62 of turret 26 is provided, as seen in FIG. 5, with pins 84 projecting downwardy, arranged in a circle about the axis of the turret and within the circle of detents 64. Pins 84 are disposed in radial alignment with detents 64, and as roller chain 70 travels along the run defined by sprocket 76, 78, the adjacent pin 84 of the turret is engaged by roller pin 70, causing the turret to be rotated to the next index position. Roller pin 72 then passes around sprocket 78, moving out of contact with the turret pin 84, and no further rotation of the turret occurs again until roller chain 72 and pin 70 have completed one full revolution.

Roller chain 72 also actuates elevator member 86 to raise and lower a magazine 28 at the operative magazine station coinciding with aperture 36 in platform 34. Elevator 86 is slidably mounted on spaced uprights 88 secured between the platform 34 and the floor 38 of base 22. Elevator 86 is T-shaped in plan, seen best in FIG. 4, and a milled groove or slot 90 is formed in the face of the T-head adjacent roller chain 72. An extension 92 of roller pin 70 projects into slot 90. As roller chain 72 and pin extension 92 advance to complete a revolution, extension 92 slides along slot 90. During the horizontal portion of the chain run between sprockets 76, 78 no vertical movement of elevator 86 is produced. However, as pin extension 92 travels downwardly from sprocket 78 toward sprocket 74, this causes elevator member 86 to slide downwardly on uprights 88 until roller pin 92 reaches the lowest point in its travel, after which continued travel of roller chain 72 will raise elevator 86 again to the original position. Chain 72 always travels in the same direction, carrying pins 70 and 92 through complete orbits.

As turret 26 is indexed from one position to the next, thereby moving the first magazine out of the operative position and a new magazine into that position, elevator 86 is disposed at its uppermost position on uprights 88 and remains in that position during the traverse of pin 70 and pin extension 92 along the horizontal run of their respective orbits. As already described the movement of pin 72 at this time effects the indexing of the turret. In order to provide for engagement and disengagement of a magazine 28 with elevator 86 at the operative station, the elevator member is formed with an upwardly and forwardly directed leg 96, as seen best in FIG. 3, constituting a hook-like projection. At the bottom of the rear wall of each magazine 28 there is a transverse slot 98, seen more particularly in FIG. 7, adapted to receive the projecting leg 96. As turret 26 rotates a magazine to the operative station coinciding with aperture 36 of platform 34, the forward lip 100 of leg 96 laterally enters slot 98 of the magazine, and in the finally indexed position of the magazine, is fully engaged in this slot. In order to facilitate this engagement, the ends of slot 98 are flared slightly.

With advance of roller chain 72 and the consequent movement of roller pin extension 92 out of the horizontal plane in passing around sprocket 78, there is a corresponding vertical shifting of magazine 28. It should also be mentioned that during the entry of lip 100 of elevator 86 into slot 98 of a magazine, the lip depresses the tail of spring detent 52 on the rear of the magazine, (see FIG. 3), thereby causing disengagement from the cooperating recess 56 in turret wall 40. Thus the magazine is no longer restrained against axial shifting movement and is free to move with elevator 86.

As the elevator moves down, the magazine 28 is lowered through aperture 36 of platform 34, being guided by engagement of its longitudinal ribs 50 in tracks 42 on the face of the turret. There is also provided a pair of guideposts 102 mounted beneath platform 34, each having a longitudinal slot 104 constituting a continuation of tracks 42 of the turret for sliding reception therein of the longitudinal ribs 50 of the magazine.

Figure 4:
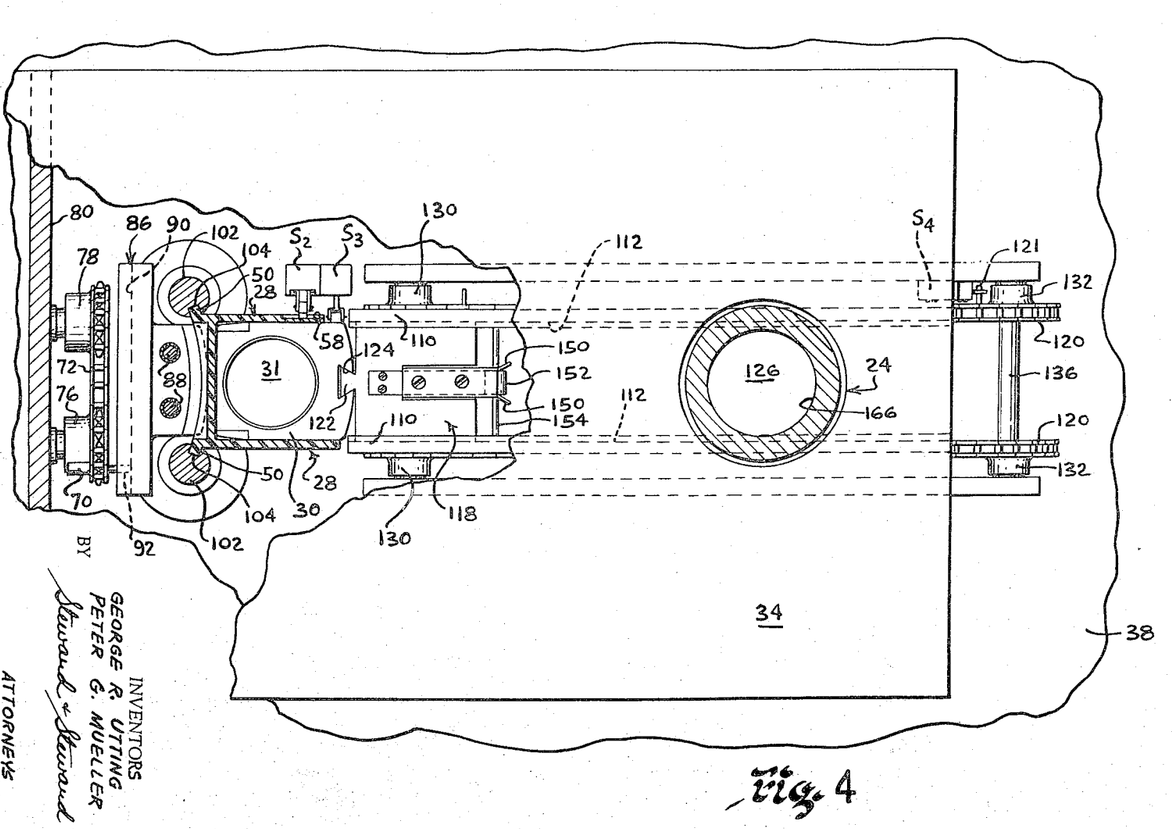
FIG. 4 is a fragmentary plan view from above, showing further details of the test station and sample transport arrangement.
Figure 6:
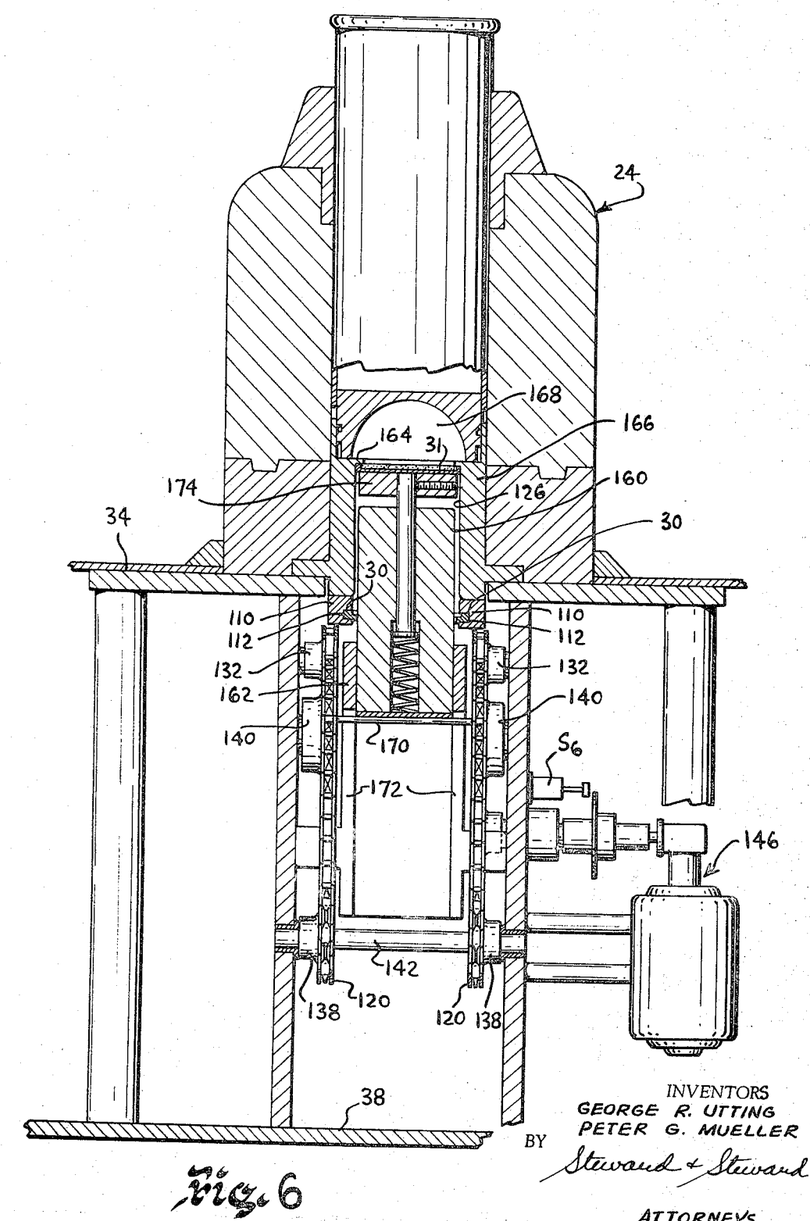
FIG. 6 is a cross-sectional view in end elevation at the test station.

The arrangement for transferring an individual slide from a magazine 28 to the test station, as represented in the drawings by shielding unit 24, includes a pair of spaced horizontal tracks 110 mounted flush with the undersurface of platform 34, as seen best in FIGS. 3, 4 and 6. Each track is provided with a groove along its opposing inner face, and tracks 110 are spaced to receive the opposite longitudinal edges of a slide 30 in grooves 112 and permit the slide to be moved along the tracks and supported thereby. Movement of the slide along tracks 110 is accomplished by a slide transport member 118 which is also slidably carried by tracks 110 and is releasably connected to a pair of spaced roller chains 120. Slide transport 118 is formed with a tongue 122 which extends rearwardly and is adapted for mating engagement with aperture 124 in slides 30 adjacent the laterally exposed edge thereof in a magazine. Aperture 124 of each slide is communicated with the adjacent exposed edge of the slide by a restricted entrant slot which prevents disengagement of the slide and tongue 122 by relative motion in their common plane. Sufficient clearance however is provided between tongue 122 and the periphery of the slide aperture to allow free passage of the tongue through the slide apertures when the magazine is shifted vertically, i.e. transversely of tongue 122, as each slide in a magazine is successively brought to the level of the slide transport. Thus when a slide has been positioned at this level, and transport 118 is drawn in the direction of the test station by roller chain 120, the slide is withdrawn from magazine 28, enters into grooves 112 of tracks 110 and is carried therealong until it reaches a first predetermined position beneath the test station, i.e. radiation shield 24. At this position further advance of the slide transport 118 and slide 30 is interrupted by abutment of the slide transport against a fixed block 125 (see FIG. 3) secured on the underside of platform 34. When the transport and slide have arrived at this first position, the sample planchet 31 of the sample slide is vertically aligned with the central aperture 126 of shielding unit 24.

As mentioned before, the conveyor mechanism utilized to transport the individual slides 30 from the magazine to the test station comprises a pair of spaced, roller chains 120 which are trained about a first pair of sprockets 130, 132. These are mounted, respectively, on shafts 134, 136, suitably journaled in opposite sides of housing 22 to provide a substantial horizontal first run portion of the roller chain immediately beneath and parallel to tracks 110 and extending from the magazine station to the test station. Chains 120 are also trained about a second pair of sprockets 138, 140, carried, respectively, on shafts 142, 144, also suitably journaled in the side walls of base 22. This second pair of sprockets is positioned intermediate the first sprockets 130, 132, so as to provide a second portion of chain run substantially perpendicular to the first portion and directly beneath the station. As seen in FIG. 3, roller chains 120 are driven by a motor and clutch assembly 146 through an interconnecting roller chain 148.

Slide transport 118 is releasably connected to roller chains 120 and in the example illustrated in the drawings, this is accomplished by providing on slide transport 118 a pair of spring clips or fingers 150 which frictionally engage opposite ends of a cylinder 152 carried by a roller pin 154 extending between chains 120. Travel of the transport 118 is confined between limiting positions on tracks 110, namely a starting position adjacent the magazine from which a slide is to be withdrawn, and an advanced position in which the transport abuts against block 125. Assuming initial frictional engagement between fingers 150 of transport 118 and cylinder 152 of the conveyor, advance of chains 120 (i.e. to the right in FIG. 3) carries the transport and slide coupled thereto along tracks 118 until the transport abuts block 125. At this point further advance of the transport and its coupled slide are interrupted, while chains 120 are free to continue their advance in the forward (clockwise) direction since disengagement of cylinder 152 from spring fingers 150 can and does occur. This continued advance of roller chains 120 is subsequently utilized to effect the elevation of the sample planchet el., which is now positioned in alignment with aperture 126 of the shield unit 24, to elevate the planchet to a position above the chain conveyor and well within the radiation shield 124, at which point the radiation count for the sample is then determined.

The elevation of the sample is produced by means of a plunger 160 mounted in a sleeve or cylinder 162 located between chains 120 and directly below and in alignment with the central aperture 126 at the test station. Plunger 160 is reciprocable in cylinder 162 from a position, as shown in FIG. 3, in which the upper surface of the plunger is beneath the path of travel of the slide 30 and from which it may be elevated, as shown in FIG. 6, to intersect the slide and lift the planchet nested therein into aperture 126 of the shielding unit 24. A peripheral lip 164 formed in sleeve 166 serving as a liner in shield unit 24, defines a stop against which the rim of the planchet 31 is brought to bear by the plunger and against which the planchet forms a gas seal. This is the position assumed by the sample during the period of radiation count, and the seal between the sample and lip 164 is desired in order to control escape of counting gas with which the chamber 168 is flooded while the radiation count is being made.

The aforesaid elevation of a sample planchet to the test position is accomplished in timed sequence with the arrival of the sample at the first position, i.e. the position on tracks 110 in which it is aligned with aperture 126 of the radiation shield. After chains 120 have moved transport 118 to the first position and the frictional engagement of the transport with the chains is broken, continued advance of the chains, in a clockwise direction as viewed in FIG. 3, is utilized to elevate the plunger 160. In order to do this, a second roller pin 170 is connected between the chains in a position to come into contact at the underside of plunger 160 during the travel of pin 170 through the aforesaid vertically disposed second run portion of the roller chain defined by sprockets 138, 140. Cylinder 162 is slotted at each side, as at 172, best seen in FIG. 6, to permit roller pin 170 to intersect the cylinder and engage the plunger to lift it to the upper position. Travel of roller chains 120 in the forward, i.e. clockwise direction in FIG. 3, is discontinued when a sample is elevated to test position. In order to allow for some slight overtravel or coasting of motor 146 and chains 120, however, plunger 160 incorporates a resiliently mounted inner piston 174 which is interposed between the head of the plunger and roller pin 170 by which it is actuated.

Reversing the direction of travel of chains 120, which is effected upon completion of the test count as later explained, withdraws roller pin 170 from slots 172 in cylinder 162, allowing the plunger to return to its initial position out of the path of the sample transport. The sample planchet is thus returned to nesting position in the body of the sample slide and the slide transport is again engaged by cylinder 152 of chains 120 to return the transport to its starting position on tracks 110. Initially, in this transport return operation, cylinder 152 does not fully enter between fingers 150 but merely pushes against them, moving the transport ahead of the cylinder. When the slide carried by the transport is reinserted in the magazine and strikes the back wall, this causes cylinder 152 to force fingers 150 apart re-establishing the frictional coupling between the slide transport and conveyor chains 120. Return travel of conveyor chains 120 is timed, by suitable limit switch means described hereinafter, to stop the conveyor when a slide has been fully reinserted in the magazine, but again allowance must be made for over travel due to coasting, and it will be apparent from the description above that the recoupling of cylinder 152 and fingers 150 provides for this overtravel, thus protecting the slide and magazine against jamming. The same result may be obtained by substitution of a resiliently mounted magnetic coupling for the frictional coupling specifically disclosed, or by a combination friction and magnetic coupling.

When the slide is thus fully reinserted in its original slot or tier in the magazine, the magazine is then shifted to bring the next slide into alignment with the transport, and the foregoing process repeated.

The automatic sequencing in presenting slides to the test position and returning them to storage in the magazines is accomplished by means of a series of component actuated switches, control relays and an electrical circuit interconnecting these with the magazine and slide transport motor assemblies 82 and 146, respectively as will now be described.

A switch S1 is positioned adjacent plunger 160 and is provided with an actuating arm which is contacted by roller pin 170 (see FIG. 3) when a sample planchet has been fully raised to the test position within shield 24. Switch S1 is a single-pole, double-throw switch. A single-pole, normally closed switch S2 (FIGS. 4 and 12) is mounted beneath platform 34 adjacent aperture 36 and has an actuating arm which engages an index or position indicating ratchet 58 molded in the side wall of the magazine 28. Each notch of ratchet 58 corresponds to a slide position in the magazine. This switch is operated only by upward movement of a magazine, as will be described presently. A single-pole, normally open switch S3 similarly located beneath platform 34 is provided with an actuating arm which extends into and makes contact with the slides 30 of a magazine 28 as the latter is shifted axially as previously decribed. If there is no slide in a particular index position of the magazine, switch S3 is not actuated and the circuit through the switch is interrupted. Again, the general positioning of switch S3 is illustrated in FIG. 4 of the drawings. A further single-pole, double-throw switch S4 is mounted beneath platform 34, adjacent sprockets 132 of conveyor chains 120 (see FIG. 3). This switch is actuated at the starting position of the sample transport, i.e. when the transport is at the start of the horizontal run, adjacent the slide magazine. A roller pin extension 121 (FIG. 4) on one of the chains 120 is provided for this purpose.

Each of the motor and clutch assemblies 82 and 146, is also provided with a single-pole, normally closed switch, S5, S6, respectively, having an actuator which is engaged by a throw-out clutch disc should a jammed condition of the mechanism occur. Switch S5 is located on the elevator motor 82; switch S6 is located on the slide transport motor 146.

Figure 13:
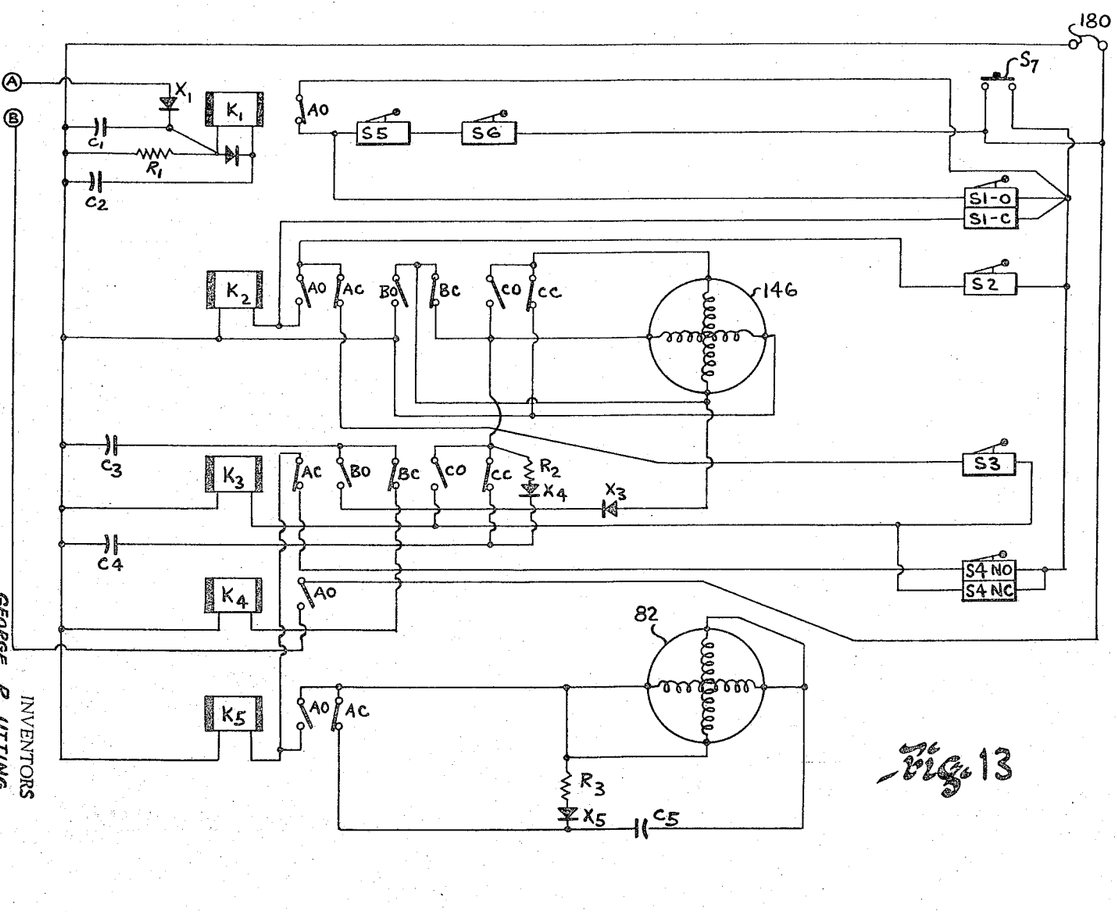
FIG. 13 is a schematic diagram of the electrical control circuit for the sample changer.

The control system also includes a number of relays and auxiliary components which are mounted on an electrical sub-chassis (not shown) housed within base 22. Since these latter are standard components whose mechanical features are well known and are not material to the present invention, these will be described solely with reference to the schematic electrical diagram shown in FIG. 13.

Figure 12:
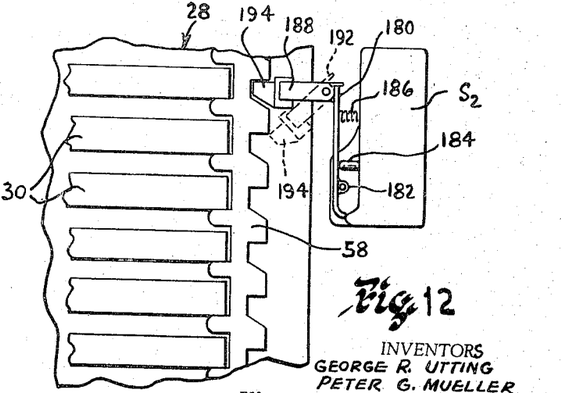
FIG. 12 is a fragmentary view in front elevation, on an enlarged scale, of a switch actuating arrangement used in conjunction with a slide magazine.

Before discussing the electrical control system in detail, a further description of the magazine indexing switch S2 will be helpful. It will be apparent that it is important to achieve accurate alignment of samples 30 stored in magazine 28 with trasport 118 and tracks 110 as magazine 28 is brought into each of its indexed positions successively for the delivery of a sample to the test station. The arrangement here disclosed accomplishes this in a unique and simple manner. Referring to FIG. 12, switch S2 is mounted adjacent the path of travel of magazine 28, and is provided with a conventional actuating arm 180 pivoted on the switch body at 182. Switch plunger 184 is thus operated by depressing the free end of arm 180 against a return spring 186. A one-way action trip lever 188 is pivotally fastened at 190 to the free end of arm 180. Lever 188 is free to pivot downwardly against a light helical spring (not shown) in pivot 190 to the dotted-line position shown, and switch S2 is not operated in this condition. But lever 188 is restrained against upward pivotal movement by a tail 192 which projects from the lever into overlying position relative to arm 180, and engages the end of this arm to dispose lever 188 normally in the horizontal position shown in solid lines. Thus movement of the magazine upwardly relative to lever 188 cams the lever toward the switch body and thus actuates plunger 184. The nose 194 of the lever is formed to make a wedge fit into the complementary depressions between ratchet teeth 58 on magazine 28. Thus unless the magazine is accurately positioned vertically so that the nose of trip lever 188 is fully received in the recess, the lever is cammed laterally toward switch S2, actuating the switch and thus providing an indication that proper alignment has not been achieved. The configuration of the ratchet teeth 58 is important in this respect, therefore, and in particular the wedge fit between the nose 194 of the trip lever and the recess between adjacent ratchet teeth, whereby very accurate adjustment of switch S2 can be set. This arrangement, more importantly, substantially reduces the effect of mechanical wear on the accuracy of the switch adjustment, ensuring long operating life.

For purposes of describing the operation of the system with reference to the circuit diagram, it is assumed first of all that the changer is in the following condition: A magazine 28 is in operative position at the sample transport, the magazine being fully lowered to dispose the top sample therein at the transport level, the slide of the first sample having been withdrawn and the planchet 31 thereof raised by plunger 160 to the test or count position within shield 24. As previously mentioned, the changer is adapted for use in conjunction with auxiliary equipment which is used to detect and record the radiation count. This auxiliary equipment includes a scaler of known construction which produces a pulse for recording purposes corresponding to the count, and a count indicator which simply totals and records the number of counts indicated by the scaler. The control system is supplied at terminals 180 (FIG. 13) with 115 v. A.C. power through a manual disconnect switch, not shown.

In the condition of the changer above-noted, a Geiger counter or other suitable radiation detection instrument in shield 24 feeds a signal to the scaler, producing a corresponding pulse which is transmitted to the count indicator, as mentioned. All relays and motors are de-energized at this moment.

In this condition, 115 volts A.C. is supplied at the count indicator terminal A (FIG. 13), and this signal keeps capacitors C1 and C2 charged. The scaler continues to count until a predetermined total count is achieved, or until a predetermined time lapse has occurred, whichever mode of operation has been selected as heretofore mentioned. Upon completion of the count, the signal input to terminal A is cut off, and resistor R1 thereupon allows capacitor C1 to discharge faster than capacitor C2. Thus a differential voltage appears across the solenoid of relay K1, and this relay is energized by this differential voltage for a brief moment, approximately a second. Energization of relay K1 closes relay contacts K1–AO. Closing these contacts energizes relay K2 through normally closed switch S1–C, and it also energizes relay K3 through normally closed contacts S4–C. These are the switches actuated at the limiting position of the sample movement, as previously described. Relay K2 serves to reverse the motor of the motor-clutch assembly 146 actuating the sample transport to and from the test station. Relay K3 serves to energize the motor of this unit to drive it in whichever direction is called for by relay K2.

Sample transport 118 thus moves out of the count position, and switch S1 by-passes relay contacts K1–AO through contacts S1–O which are now closed. At the same time, contacts S1–C open, and relay K2 is now held by the circuit including relay contacts K2–AO, switch contacts S2–C and S1–O. As the sample transport approaches the magazine, the slide 30 activates switch S3, and when the slide is fully reinserted in the magazine, the sample transport activates switch S4. Contacts S4–C open and de-energize sample transport motor 146 and relay K3. This closes contacts K3–CC again. Capacitor C4, which was charged through rectifier X4 and resistor R2, discharges into motor 146, thus applying D.C. braking. At the same time relay K5 is energized through switch contacts S4–O and relay contacts K3–AC. This starts motor 82 of the magazine elevator which, as mentioned was assumed to be in its lowest position, which is the position to which each magazine is moved initially after it is indexed to the operative position relative to the slide transport. Thus upon completion of the test of the first or topmost slide in the magazine the magazine is elevated upon the aforesaid energization of motor 82. As previously described, the actuating arm of index switch rides on ratchet 58 of the magazine wall. Switch contacts S2–C open and relay K2 is then released as the elevator moves upwardly causing the switch arm to ride over the tooth of ratchet 58. At about the same time, sample detect switch S3 drops off the first slide of the previously counted sample and deactivates the slide transport circuit. Unless there is a slide in the following position in the magazine, the slide transport is not operated. But assuming there is a slide in the next magazine position, as switch S2 drops into the corresponding index position of ratchet 58, relay K3 is energized through switch S3, relay contacts K2–AC, switch contacts S2–C and S1–O. This restarts motor 146 which now runs in the opposite direction from before, since relay K2 is not now energized.

If there had not been a slide in the next indexed position of the magazine, switch S3 would not have been actuated and magazine 28 would be raised by the elevator and motor 82 until a slide is detected by the switch. As relay contacts K3–AC open upon re-energization again of relay K3 as previously described, relay K5 and magazine motor 82 are de-energized and the elevator stops. Again, D.C. braking is applied to the elevator motor by capacitive discharge therethrough.

During movement of sample transport 118 to position a sample at the detector station, capacitor C3 is charged through a circuit including relay contacts K3–BO, rectifier X3 and relay contacts K2–BC. When the transport reaches the elevated or count position within shield 24, switch S1 is activated, opening contacts S1–O, and transport motor 146 stops. As relay contacts K3–BC close, capacitors C3 is discharged into the solenoid of relay K4. Contacts K4–AO close for approximately one second to provide a pulse at terminal B, resetting and starting the scaler.

Jam switches S5 and S6 are simply provided to protect the mechanism should it become blocked in some manner, for instance improperly indexed position of the turret or a magazine. These switches are activated by clutches with preset torque at their respective motor units. An override switch S7 is provided to manually override the system for test or for starting purposes.

The foregoing changer operations are repeated with respect to each of the slides in a magazine as it is indexed successively upwardly from its lowermost starting position until all the slides in the magazine have been withdrawn, tested and returned. When the last slide is returned to the magazine, the final increment of vertical movement of elevator 86 returns the magazine to its original position relative to turret 26. At this time, as already described, roller pin 70 of the elevator roller chain 72 enters its horizontal travel, producing rotation of the turret and indexing of the next magazine into operative position. As the first magazine is rotated out of engagement with the lip 96 of elevator 86, the magazine supporting detent spring 52 re-engages the recess 56 in the face of wall 40 of the turret so that the magazine is again suspended on the turret out of contact with the surface of platform 34.

When all of the samples of all of the magazines have been tested, the cycle is repeated unless A.C power is manually disconnected, as by a switch (not shown). If desired appropriate switching arrangement may be incorporated with the magazine turret to be actuated upon completion of a full revolution of the turret to discontinue the operation of the sample changer automatically. Alternatively, a switching circuit may be provided to produce a second cycle of operation, after which operation of the unit is then disconnected automatically. Such circuit means are conventional, form no part of the invention and are obvious to those skilled in the art, wherefore specific description of them here is not necessary.

It will be understood that the foregoing specific embodiments of the invention has been shown and described by way of illustration and not precise limitation, and that various modifications may be made in respect to many of the mechanical and electrical arrangements without departing from the scope and spirit of the invention which are defined by the appended claims.

What is claimed is:

1. In an automatic sample changer, conveyor means comprising a moving conveyor element, a first set of spaced supports on which said conveyor element is carried to define a first run portion for said element, and a second set of spaced supports over which said element is also trained and defining a second run portion for said element, said second set of supports being positioned intermediate the first run portion of said conveyor and disposed to direct said second run portion transversely of the first, means including said conveyor element for advancing a sample from a starting position along said first run portion and means adjacent said first run portion which is engaged on arrival of a sample at a first predetermined position to interrupt further advance of said sample notwithstanding continued advance of said conveyor element, means disposed at said predetermined position for moving a sample transversely of said first run portion and generally in the direction of said second run portion of said conveyor, said last means comprising a reciprocable member normally positioned out of the path of said first run portion of said conveyor but movable to intersect said path whereby to engage and carry a sample at said first predetermined position to a second predetermined position displaced from said first run portion, said reciprocable member being engaged by said conveyor element to move it to said second predetermined position in timed sequence with the arrival of the sample at said first predetermined position, and means for reversing the direction of travel of said conveyor element upon arrival of said reciprocable member and sample at said second predetermined position whereby to return said plunger to said normal position relative to said conveyor element, redeposit the sample on said conveyor and return said sample to the starting position.

2. An automatic sample changer as defined in claim 1, which further includes a sample transport confined for movement along said conveyor first run portion between a starting position and said first predetermined sample position, coupling means for releasably connecting said transport to said conveyor element, said coupling means including a resilient member operable at least in the direction of movement of said conveyor element to effect coupling with said transport to permit slight overtravel of said conveyor element after said transport has reached starting position.

3. An automatic sample changer as defined in claim 2, which also includes a radiation shield having a cylindrical recess, said reciprocable member comprising a plunger including a head portion making a sliding fit in said shield recess, and a fixed stop within said recess cooperating with said plunger to define said second predetermined sample position, said plunger including resilient means to permit overtravel of said conveyor element relative to said plunger after the latter has arrived at said second predetermined sample position.

4. In an automatic sample changer, conveyor means comprising a continuous conveyor element having first and second run portions disposed in directions substantially transverse to each other, means on said conveyor element for advancing a sample from a starting position along said first run portion of said conveyor, and means adjacent said first run portion which is engaged upon arrival of a sample at a first predetermined position to interrupt further advance of said sample along said first run portion notwithstanding continued advance of said conveyor element, means disposed at said first predetermined position for moving a sample transversely of said first run portion and generally parallel to said second run portion of said conveyor element, said last means including a reciprocable sample carrier normally positioned out of the path of said first run conveyor portion but movable to intersect said path whereby to engage and carry a sample at said first predetermined position to a second predetermined position displaced therefrom, said carrier having means for engagement by said conveyor element in its second run portion to move said carrier and sample to said second predetermined position in timed sequence with the arrival of such sample at said first predetermined position, and means for reversing the direction of travel of said conveyor element upon arrival of said carrier element and sample at said second predetermined position whereby to return said carrier element to said normal position relative to said conveyor element, redeposit said sample on said conveyor element and return said sample to said starting position.

5. In an automatic sample changer for a plurality of similar samples of material mounted in planchets each carried in a slide, wherein the samples are subjected successively to radioassay test; box storage magazine means for said slide mounted samples, horizontally disposed conveyor means having a first run portion at a given level to receive a slide from said magazine, advance it to a test station and return it to its original place in said magazine upon completion of a test cycle, and magazine positioning means for shifting said magazine vertically to dispose different slides successively at said conveyor level; said slides being individually supported in said magazine in vertically tiered relation, said magazine having an open lateral face through which the slide at each tier may be laterally withdrawn, a magazine shifting member engageable with the magazine and guide means defining a linear, substantially vertical path of movement for said magazine and magazine shifting member, and orbital means of unidirectional rotation continuously coupled to said shifting member to reciprocate the latter between limiting positions on said guide means, said orbital means defining in a portion of its travel a linear run substantially parallel to and spaced slightly above said conveyor.

6. An automatic sample changer as defined in claim 5, which includes means for supporting a plurality of magazines and said orbital means has a member for engaging and advancing the magazines successively into engagement with said magazine shifting member during travel along said linear run portion.

7. An automatic sample changer as defined in claim 6, wherein said means for supporting said magazine is a turret and said orbital means has a second member engageable with said turret during said linear run, whereby said turret is indexed in successive steps to bring a different magazine into operative position upon completion of the test cycles of all samples in a preceding magazine.

8. In an automatic sample changer for a plurality of similar, generally lamellar sample trays, box magazine means having side, back and end walls and an open face, means in said walls for supporting said trays in tiers generally perpendicular to said open face of said magazine whereby individual trays may be withdrawn through said open face, said magazine having in at least one of its side and back walls a ratchet tooth configuration along the extent of the magazine and forming wedge-shaped recesses between adjacent teeth, with at least one recess corresponding to each tray position in said magazine; and horizontally disposed conveyor means having a first run portion at a given level to receive a given tray from said box magazine, advance it to a test station and return it to its original place in said magazine upon completion of a test cycle, and magazine positioning means for shifting said magazine axially to dispose different trays successively at said conveyor level, said means including a switch and a motor controlled by said switch, means connecting said motor to said magazine for shifting the latter, said switch having an actuating arm including a lever pivotally connected thereto, said lever being free to pivot in one direction and resilient means urging said lever in the opposite direction to engage a stop and to dispose the free end of said lever in the path of said magazine ratchet teeth, said lever being formed at said free end to mate with the wedge-shaped recesses between said teeth, said lever being cammed away from said magazine by said teeth when said magazine is shifted in a direction causing said lever to pivot against said stop, thereby actuating said switch, and said lever being pivoted against its resilient means when said magazine is shifted in the opposite direction, whereby said lever is disabled to actuate said switch.

9. An automatic sample changer as defined in claim 6, wherein said orbital means for vertically positioning said magazine comprises an endless chain and sprockets therefor over which said chain is trained, said sprockets being positioned, respectively, adjacent opposite ends of said linear path defined by said guide means, a pin carried by said chain projecting laterally thereof into engagement with said magazine shifting member, and a horizontally extending slot formed in said magazine shifting member into which the outer end of said pin extends to provide said engagement.

10. An automatic sample changer as defined in claim 7, which further includes a releasable latch carried by each of said magazines and normally supporting them on said turret above the level of said horizontally disposed conveyor means, and means carried by said magazine shifting member for engaging and releasing the magazine latch of the advancing magazine when said magazine shifting member is at its upper limiting position on its guide means.

References Cited

UNITED STATES PATENTS

| 1,388,193 | 8/1921  | Polmer          | 88—27     |
| 2,919,021 | 12/1959 | Robinson et al. | 88—28 X   |
| 2,931,115 | 4/1960  | Pester et al.   | 88—28 X   |
| 3,038,078 | 6/1962  | Kern            | 250—106   |
| 3,141,977 | 7/1964  | Fratantuno      | 250—106   |

FOREIGN PATENTS

| 1,075,753 | 2/1960 | Germany. |

LOUIS R. PRINCE, *Primary Examiner.*

S. CLEMENT SWISHER, *Assistant Examiner.*